United States Patent
Murakami et al.

(10) Patent No.: US 6,821,094 B2
(45) Date of Patent: Nov. 23, 2004

(54) HYBRID POWER TRANSMISSION SYSTEM HAVING FIRST AND SECOND CLUTCH MECHANISMS

(75) Inventors: Kazuo Murakami, Kariya (JP); Yasuharu Odachi, Kariya (JP); Taku Adaniya, Kariya (JP); Takeshi Kawata, Kariya (JP); Kazuhiko Minami, Kariya (JP); Akihito Yamanouchi, Kariya (JP); Masahiro Kawaguchi, Kariya (JP); Hirohito Hayashi, Kariya (JP); Jiro Iwasa, Kariya (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 4 days.

(21) Appl. No.: 10/303,202

(22) Filed: Nov. 25, 2002

(65) Prior Publication Data

US 2003/0098186 A1 May 29, 2003

(30) Foreign Application Priority Data

Nov. 29, 2001 (JP) ........................................ 2001-364632

(51) Int. Cl.⁷ ........................... F04B 49/00; T04B 17/03
(52) U.S. Cl. ........................ 417/223; 417/374; 310/92; 198/48.92
(58) Field of Search ................................. 417/223, 374, 417/362, 364; 310/92, 75 R; 192/48.92, 110 B (56) References Cited

U.S. PATENT DOCUMENTS

| | | | | |
|---|---|---|---|---|
| 4,169,360 A | * | 10/1979 | Shimizu | 62/323.2 |
| 5,867,996 A | * | 2/1999 | Takano et al. | 62/175 |
| 6,247,899 B1 | * | 6/2001 | Ban et al. | 417/16 |
| 6,375,436 B1 | * | 4/2002 | Irie et al. | 417/223 |
| 6,617,727 B2 | | 9/2003 | Iwasa et al. | 310/75 R |
| 6,619,929 B2 | * | 9/2003 | Adaniya et al. | 417/223 |
| 6,638,027 B2 | * | 10/2003 | Mohrmann | 417/223 |

FOREIGN PATENT DOCUMENTS

| | | |
|---|---|---|
| JP | 06-087678 | 12/1994 |
| JP | 11-030182 | 2/1999 |
| JP | 11-037046 | 2/1999 |
| JP | 2001-140757 | 5/2001 |
| JP | 2002-106462 | 4/2002 |

OTHER PUBLICATIONS

Japanese Laid–Open Patent Publication No. 2001–140757 and its English abstract, and its partial translation of paragraphs [0023] and [0024].
Japanese Unexamined Utility Model Publication No. 6–87678 and its partial translation of [0013].
Japanese Laid–Open Patent Publication No. 11–30182 and its English abstract, and its partial translation from line 9 on p. 4 in left column to line 25 on p. 4 in left column.

(List continued on next page.)

*Primary Examiner*—Charles G. Freay
(74) *Attorney, Agent, or Firm*—Morgan & Finnegan, LLP (57) ABSTRACT

A compressor includes a housing, a rotary shaft, a pulley, an electric motor, a pulley one-way clutch, and a motor one-way clutch. The shaft is rotatably supported by the housing. The pulley is operably connected to the shaft and includes a power transmission portion. When power is transmitted from a vehicular engine to the power transmission portion, the pulley is rotated. The electric motor rotates the shaft and includes a rotor, which is operably connected to the shaft. At least part of the electric motor overlaps the power transmission portion in the axial direction of the shaft. The pulley one-way clutch is located between the pulley and the shaft and selectively permits and prevents power transmission between the pulley and the shaft. The motor one-way clutch is located between the rotor and the shaft and selectively permits and prevents power transmission between the rotor and the shaft.

18 Claims, 4 Drawing Sheets

OTHER PUBLICATIONS

Japanese Laid–Open Patent Publication No. 11–037046 and its English abstract.

Japanese Laid–Open Patent Publication No. 2002–106462 and its English abstract, and its partial translation of paragraph [0019].

U.S. patent application Ser. No. 10/303,429, Hayashi, filed Nov. 25, 2002.

U.S. patent application Ser. No. 10/303,406, Hayashi, filed Nov. 25, 2002.

* cited by examiner

//HYBRID POWER TRANSMISSION SYSTEM HAVING FIRST AND SECOND CLUTCH MECHANISMS

BACKGROUND OF THE INVENTION

The present invention relates to a vehicular rotational apparatus that has a rotary body and an electric motor. The rotary body is operably connected to a rotary shaft, which drives a mechanism, and transmits power to the rotary shaft from an external drive source. The electric motor selectively drives the rotary shaft.

A typical compressor drives a compressing mechanism for compressing refrigerant by selectively using power from an external drive source and power from an electric motor, which is located on the compressor. Japanese Laid-Open Patent Publication No. 11-30182 discloses such compressor.

The compressor of the above publication has a pulley for receiving power from the external drive source and a rotary shaft for driving the compression mechanism. A pulley one-way clutch is located in a power transmission path between the pulley and the rotary shaft. A motor one-way clutch is located in a power transmission path between the electric motor for driving the compression mechanism and the rotary shaft.

Therefore, the compression mechanism is driven by power from the external drive force without rotating the rotor of the electric motor. As a result, power transmitted from the external drive source to the rotary shaft is prevented from being consumed unnecessarily for purposes other than driving compression mechanism.

In the above structure, the size of the compressor is reduced by using the one-way clutch instead of an electromagnetic clutch. However, the location of, for example, the electric motor to reduce the size of the compressor is not disclosed.

SUMMARY OF THE INVENTION

Accordingly, it is an objective of the present invention to provide a vehicular rotational apparatus that is minimized in the axial direction of a rotary shaft.

To achieve the above objective, the present invention provides a vehicular rotational apparatus that is driven by an external drive source. The rotational apparatus includes a housing, a rotary shaft, a first rotary body, an electric motor, a first clutch mechanism, and a second clutch mechanism. The rotary shaft is rotatably supported by the housing. The first rotary body is operably connected to the rotary shaft and includes a power transmission portion. When power is transmitted from the external drive source to the power transmission portion, the first rotary body is rotated. The electric motor rotates the rotary shaft and includes a second rotary body, which is operably connected to the rotary shaft. At least part of the electric motor overlaps the power transmission portion in the axial direction of the rotary shaft. The first clutch mechanism is located between the first rotary body and the rotary shaft and selectively permits and prevents power transmission between the first rotary body and the rotary shaft. The second clutch mechanism is located between the second rotary body and the rotary shaft and selectively permits and prevents power transmission between the second rotary body and the rotary shaft.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
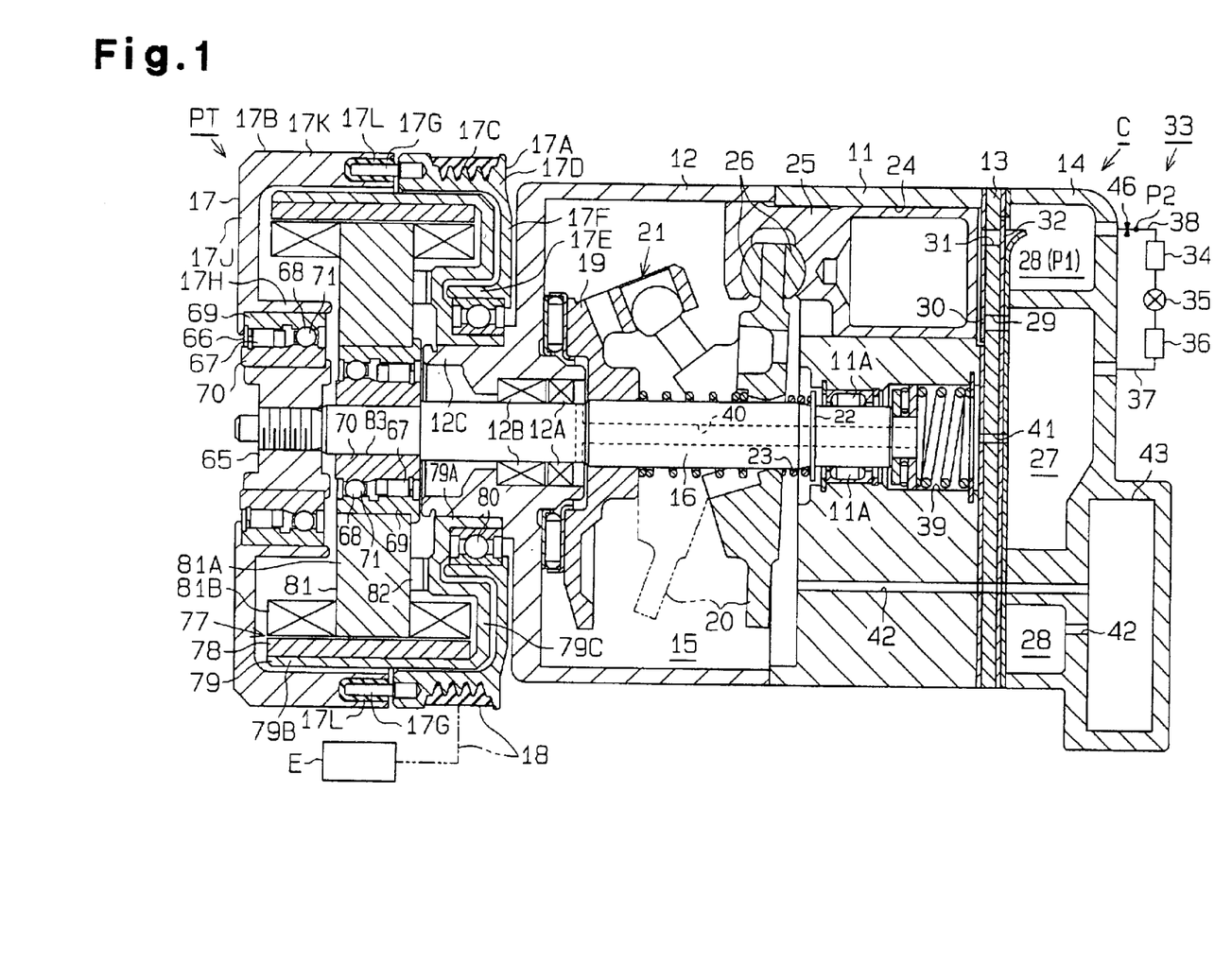
FIG. 1 is a schematic cross-sectional view illustrating a compressor according to a first embodiment of the present invention.

A compressor C according to a first embodiment of the present invention will now be described with reference to FIGS. 1 to 3(b). The left end of the compressor C in FIG. 1 is defined as the front of the compressor, and the right end is defined as the rear of the compressor C.

The compressor C forms a part of a vehicular air conditioner. As shown in FIG. 1, the compressor C includes a cylinder block 11, a front housing member 12, a valve plate assembly 13, and a rear housing member 14. The front housing member 12 is secured to the front end of the cylinder block 11. The rear housing member 14 is secured to the rear end of the cylinder block 11 with the valve plate assembly 13 in between. The cylinder block 11, the front housing member 12, the valve plate assembly 13, and the rear housing member 14 form the housing of the compressor C.

The cylinder block 11 and the front housing member 12 define a control pressure zone, which is a crank chamber 15 in the first embodiment, in between.

A rotary shaft 16 is housed in the compressor housing and extends through the crank chamber 15. The front portion of the rotary shaft 16 is supported by a radial bearing 12A located in the front wall of the front housing member 12. The rear portion of the rotary shaft 16 is supported by a radial bearing 11A located in the cylinder block 11.

The front end portion of the rotary shaft 16 extends through the front wall of the front housing member 12. A power transmission mechanism PT is fixed to the front end of the rotary shaft 16. The power transmission mechanism PT includes a first rotary body, which is a pulley 17 in the first embodiment. The front end of the rotary shaft 16 is coupled to an external drive source, which is a vehicular engine E in the first embodiment, by the power transmission mechanism PT and a belt 18, which is engaged with the pulley 17.

A sealing member 12B is located between the front end of the rotary shaft 16 and the front wall of the front housing member 12. The sealing member 12B is located outward of the front housing member 12 from the radial bearing 12A in the axial direction of the rotary shaft 16. The sealing member 12B separates the inside and outside of the compressor housing.

The power transmission mechanism PT and the compressor C form a vehicular rotational apparatus in the first embodiment.

A lug plate 19 is coupled to the rotary shaft 16 and is located in the crank chamber 15. The lug plate 19 rotates integrally with the rotary shaft 16. A drive plate, which is a swash plate 20 in the first embodiment, is housed in the crank chamber 15. The swash plate 20 slides along and inclines with respect to the rotary shaft 16. The swash plate 20 is coupled to the lug plate 19 by a hinge mechanism 21. The lug plate 19 permits the swash plate 20 to rotate integrally with the rotary shaft 16 and to incline with respect to the rotary shaft 16 while sliding along the rotation axis of the rotary shaft 16.

A snap ring 22 is fitted about the rotary shaft 16. A spring 23 extends between the snap ring 22 and the swash plate 20. The snap ring 22 and the spring 23 limit the minimum inclination angle of the swash plate 20. At the minimum inclination angle of the swash plate 20, the angle defined by the swash plate 20 and the axis of the rotary shaft 16 is closest to ninety degrees.

Cylinder bores 24 (only one is shown in FIG. 1) are formed in the cylinder block 11. The cylinder bores 24 are located about the rotation axis of the rotary shaft 16. A single-headed piston 25 is housed in each cylinder bore 24 to reciprocate inside the cylinder bore 24. The front and rear openings of each cylinder bore 24 are closed by the associated piston 25 and the valve plate assembly 13. A compression chamber is defined in each cylinder bore 24. The volume of the compression chamber changes according to the reciprocation of the corresponding piston 25. Each piston 25 is coupled to the peripheral portion of the swash plate 20 by a pair of shoes 26. When the swash plate 20 is rotated by rotation of the rotary shaft 16, the shoes 26 convert the rotation into reciprocation of each piston 25.

The cylinder block 11, the rotary shaft 16, the lug plate 19, the swash plate 20, the hinge mechanism 21, the pistons 25, and the shoes 26 form a piston type variable displacement compression mechanism. The compression mechanism is driven by the rotary shaft 16 to compress and discharge refrigerant.

A suction pressure zone, which is a suction chamber 27 in the first embodiment, and a discharge pressure zone, which is a discharge chamber 28 in the first embodiment, are defined in the rear housing member 14. The front ends of the suction chamber 27 and the discharge chamber 28 are closed by the valve plate assembly 13. As each piston 25 moves from the top dead center position to the bottom dead center position, refrigerant gas is drawn into the corresponding cylinder bore 24 (compression chamber) through the corresponding suction port 29 while flexing the suction valve flap 30 to an open position. Low pressure refrigerant gas that is drawn into the cylinder bore 24 is compressed to a predetermined pressure as the piston 25 is moved from the bottom dead center position to the top dead center position. Then, the gas is discharged to the discharge chamber 28 through the corresponding discharge port 31 while flexing the discharge valve flap 32 to an open position.

The suction chamber 27 is connected to the discharge chamber 28 by an external refrigerant circuit 33. The external refrigerant circuit 33 includes a condenser 34, a decompression device, which is an expansion valve 35 in the first embodiment, and an evaporator 36. The opening degree of the expansion valve 35 is feedback-controlled based on the temperature and pressure of refrigerant detected by a heat sensitive tube (not shown) at the outlet, or downstream, of the evaporator 36. The expansion valve 35 supplies refrigerant, the amount of which corresponds to the thermal load (cooling load), to the evaporator 36 to regulate the flow rate in the external refrigerant circuit 33.

A connecting pipe 37 for refrigerant gas is located at a downstream portion of the external refrigerant circuit 33 and connects the outlet of the evaporator 36 to the suction chamber 27 of the compressor C. Another connecting pipe 38 for refrigerant gas is located at an upstream portion of the external refrigerant circuit 33 and connects the discharge chamber 28 of the compressor C to the condenser 34. The compressor C draws in refrigerant gas introduced into the suction chamber 27 from the downstream portion of the external refrigerant circuit 33 and compresses the refrigerant gas. Then, the compressor C discharges the compressed gas to the discharge chamber 28, which is connected to the upstream portion of the external refrigerant circuit 33.

The compressor C and the external refrigerant circuit 33 constitute a refrigeration circuit (or refrigerant circuit) of the vehicular air-conditioner.

The cylinder block 11 has a shaft bore 39, which accommodates the rear end of the rotary shaft 16. A shaft passage 40 is formed in the rotary shaft 16 to connect the front portion of the crank chamber 15 with the shaft bore 39. A communication passage 41 is formed in the valve plate assembly 13 to connect the suction chamber 27 with the shaft bore 39. The shaft bore 39, the shaft passage 40, and the communication passage 41 constitutes a bleed passage, which connects the crank chamber 15 with the suction chamber 27.

A supply passage 42 is formed in the housing to connect the discharge chamber 28 with the crank chamber 15. A control valve 43 is located in the supply passage 42 to regulate the opening degree of the supply passage 42.

The opening of the control valve 43 is adjusted to control the flow rate of highly pressurized gas supplied to the crank chamber 15 through the supply passage 42. The pressure in the crank chamber 15 (crank chamber pressure Pc) is determined by the ratio of the gas supplied to the crank chamber 15 through the supply passage 42 and the flow rate of refrigerant gas conducted out from the crank chamber 15 through the bleed passage. As the crank chamber pressure Pc varies, the difference between the crank chamber pressure Pc and the pressure in the compression chambers varies, which changes the inclination angle of the swash plate 20. Accordingly, the amount of refrigerant discharged from the compression mechanism during one rotation of the rotary shaft 16 is varied.

The compressor C according to the first embodiment is formed such that the amount of refrigerant discharged during one rotation of the rotary shaft 16 is substantially zero when the inclination angle of the swash plate 20 is minimum.

The greater the flow rate of the refrigerant Q flowing in the refrigerant circuit is, the greater the pressure loss per unit length of the circuit or piping is. That is, the pressure loss (pressure difference) between first and second pressure monitoring points P1, P2 has a positive correlation with the flow rate of the refrigerant Q in the refrigerant circuit. Detecting the pressure difference between the first and second pressure monitoring points P1, P2 (PdH−PdL= pressure difference ΔPX) permits the flow rate of refrigerant Q in the refrigerant circuit to be indirectly detected.

In the first embodiment, the first pressure monitoring point P1, which functions as a high pressure monitoring point, is located in the discharge chamber 28, the pressure of which is equal to that of the most upstream section of the connecting pipe 38. The second pressure monitoring point P2, which functions as a low pressure monitoring point, is located midway along the connecting pipe 38 at a position separated from the first pressure monitoring point P1 by a predetermined distance. The pressure PdH at the first pressure monitoring point P1 is applied to the control valve 43 through a first pressure introduction passage 44 (see FIG. 2). The pressure PdL at the second pressure monitoring point P2 is applied to the control valve 43 through a second pressure introduction passage 45 (see FIG. 2).

A throttle 46 may be formed in the connecting pipe 38 between the first and second pressure monitoring points P1, P2 to increase the pressure difference ΔPX. The throttle 46 increases the pressure difference ΔPX between the first and second pressure monitoring points P1, P2 although the first and second pressure monitoring points P1, P2 are not separated by a large amount. Providing the throttle 46 between the first and second pressure monitoring points P1, P2 permits the second pressure monitoring point P2 to be located close to the compressor C. This shortens the second pressure introduction passage 45 between the second pressure monitoring point P2 and the control valve 43. The pressure PdL at the second pressure monitoring point P2 is set sufficiently higher than the crank chamber pressure Pc although the pressure PdL is decreased with respect to the pressure PdH by the throttle 46.

Figure 2:
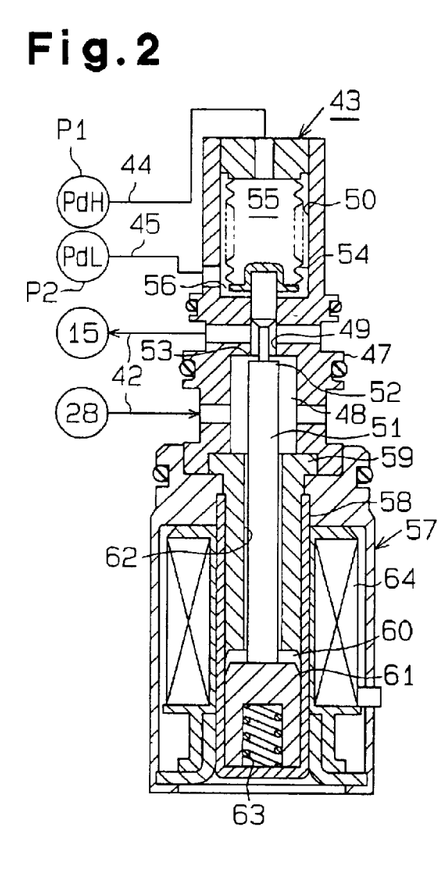
FIG. 2 is a schematic cross-sectional view illustrating a control valve according to the first embodiment.

As shown in FIG. 2, the control valve 43 has a valve housing 47. The valve housing 47 defines a valve chamber 48, a communication passage 49, and a pressure sensing chamber 50. A transmission rod 51 extends through the valve chamber 48 and the communication passage 49. The transmission rod 51 moves in the axial direction, or in the vertical direction as viewed in FIG. 2.

The communication passage 49 is disconnected from the pressure sensing chamber 50 by the upper portion of the transmission rod 51, which is fitted in the communication passage 49. The valve chamber 48 is connected to the discharge chamber 28 through an upstream section of the supply passage 42. The communication passage 49 is connected to the crank chamber 15 by a downstream section of the supply passage 42. The valve chamber 48 and the communication passage 49 form a part of the supply passage 42.

A valve body 52 is formed at the middle portion of the transmission rod 51 and is located in the valve chamber 48. A step defined between the valve chamber 48 and the communication passage 49 functions as a valve seat 53. The communication passage 49 serves as a valve hole. The transmission rod 51 shown in FIG. 2 is located at the lowermost position where the opening degree of the communication passage 49 is the greatest. When the transmission rod 51 is moved from the lowermost position to the uppermost position, at which the valve body 52 contacts the valve seat 53, the communication passage 49 is disconnected from the valve chamber 48. That is, the valve body 52 of the transmission rod 51 is a valve body that controls the opening degree of the supply passage 42.

A pressure sensing member, which is a bellows 54 in the first embodiment, is located in the pressure sensing chamber 50. The upper end of the bellows 54 is fixed to the valve housing 47. The lower end of the bellows 54 receives the upper end of the transmission rod 51. The bellows 54 divides the pressure sensing chamber 50 into a first pressure chamber 55, which is the interior of the bellows 54, and a second pressure chamber 56, which is the exterior of the bellows 54. The first pressure chamber 55 is connected to the first pressure monitoring point P1 by the first pressure introduction passage 44. The second pressure chamber 56 is connected to the second pressure monitoring point P2 by the second pressure introduction passage 45. Therefore, the first pressure chamber 55 is exposed to the pressure PdH monitored at the first pressure monitoring point P1, and the second pressure chamber 56 is exposed to the pressure PdL monitored at the second pressure monitoring point P2. The bellows 54 and the pressure sensing chamber 50 form a pressure sensing mechanism.

A target pressure difference changing means, which is an electromagnetic actuator 57 in the first embodiment, is located at the lower portion of the valve housing 47. The electromagnetic actuator 57 includes a cup-shaped cylinder 58, which is arranged coaxial to the valve housing 47. A stationary iron core 59 is fitted in the upper opening of the cylinder 58 and is secured to the cylinder 58. The stationary iron core 59 defines a plunger chamber 60 at the lowermost portion in the cylinder 58.

A movable iron core 61 is located in the plunger chamber 60. The movable iron core 61 slides along the plunger chamber 60 in the axial direction. An axially extending guide hole 62 is formed in the central portion of the stationary iron core 59. The lower end of the transmission rod 51 is located in the guide hole 62 to move axially. The lower end of the transmission rod 51 abuts against the movable iron core 61 in the plunger chamber 60.

A coil spring, which is a spring 63 in the first embodiment, is located between the inner bottom surface of the cylinder 58 and the movable iron core 61 in the plunger chamber 60. The spring 63 urges the movable iron core 61 toward the transmission rod 51. The transmission rod 51 is urged toward the movable iron core 61 by the elasticity of the bellows 54. Therefore, the movable iron core 61 and the transmission rod 51 integrally move vertically. Hereinafter, urging force based on the elasticity of the bellows 54 is referred to as the spring force of the bellows. The spring force of the bellows 54 is greater than the force of the spring 63.

A coil 64 is wound about the stationary iron core 59 and the movable iron core 61 on the outer circumference of the cylinder 58. Power is supplied to the coil 64 from a battery via a drive circuit (not shown) based on commands from a controller, which is not shown.

The coil 64 generates an electromagnetic force (electromagnetic attracting force) between the movable iron core 61 and the stationary iron core 59 in accordance with the value of current supply to the coil 64. Upward force is applied to the transmission rod 51 via the movable iron core 61 in accordance with the electromagnetic force. In the first embodiment, current supplied to the coil 64 is varied by controlling the applied voltage. The applied voltage is controlled by pulse-width modulation, or duty control.

According to the control valve 43, the position of the transmission rod 51 (valve body 52), or the opening degree, is determined in the following manner.

When no current is supplied to the coil 64, or when the duty ratio is zero percent, the downward force generated by the spring force of the bellows 54 dominantly acts on the transmission rod 51. Thus, the transmission rod 51 is placed at its lowermost position, and the communication passage 49 is fully opened. Therefore, the crank chamber pressure Pc is the maximum that is possible under the given conditions. The pressure difference between the crank chamber pressure Pc and the pressure in the compression chambers thus becomes large. As a result, the inclination angle of the swash plate 20 is minimized and the amount of refrigerant discharged during one rotation of the rotary shaft 16 is also minimized.

When a current of the minimum duty ratio or more within the variation range of the duty ratio is supplied to the coil 64, the resultant of the upward force of the spring 63 and the upward electromagnetic force exceeds the downward force generated by the spring force of the bellows 54 so that the transmission rod 51 is moved upward. In this state, the resultant of the upward force of the spring 63 and the upward electromagnetic force acts against the resultant of the force based on the pressure difference ΔPX and the downward force generated by the spring force of the bellows 54. The position of the valve body 52 of the transmission rod 51 relative to the valve seat 53 is determined such that upward and downward forces are balanced.

For example, if the flow rate of refrigerant in the refrigerant circuit is decreased, the downward force based on the pressure difference ΔPX, which acts on the transmission rod 51, decreases. Therefore, the transmission rod 51 (valve body 52) moves upward to decrease the opening degree of the communication passage 49, which lowers the crank chamber pressure Pc. Accordingly, the inclination angle of the swash plate 20 is increased, and the displacement of the compressor C is increased. The increase in the displacement of the compressor C increases the flow rate of refrigerant in the refrigerant circuit, which increases the pressure difference ΔPX.

In contrast, when the flow rate of refrigerant in the refrigerant circuit is increased, the downward force based on the pressure difference ΔPX increases. Therefore, the transmission rod 51 (valve body 52) moves downward to increase the opening degree of the communication passage 49, which increases the crank chamber pressure Pc. Accordingly, the inclination angle of the swash plate 20 is decreased, and the displacement of the compressor C is decreased. The decrease in the displacement of the compressor C decreases the flow rate of refrigerant in the refrigerant circuit, which decreases the pressure difference ΔPX.

When the duty ratio of the electric current supplied to the coil 64 is increased to increase the upward electromagnetic force, the pressure difference ΔPX cannot balance the forces acting on the transmission rod 51. Therefore, the transmission rod 51 (the valve body 52) moves upward and decreases the opening degree of the communication passage 49. As a result, the displacement of the compressor C is increased. Thus, the flow rate of refrigerant in the refrigerant circuit increases, which increases the pressure difference ΔPX.

When the duty ratio of the electric current supplied to the coil 64 is decreased to decrease the upward electromagnetic force, the pressure difference ΔPX cannot balance the forces acting on the transmission rod 51. Therefore, the transmission rod 51 (the valve body 52) moves downward and increases the opening degree of the communication passage 49. As a result, the displacement of the compressor C is decreased. Thus, the flow rate of refrigerant in the refrigerant circuit decreases, which decreases the pressure difference ΔPX.

As described above, the target value of the pressure difference ΔPX is determined by the duty ratio of current supplied to the coil 64. The control valve 43 automatically determines the position of the transmission rod 51 (the valve body 52) according to changes of the pressure difference ΔPX to maintain the target value of the pressure difference ΔPX. The target value of the pressure difference ΔPX is externally controlled by adjusting the duty ratio of current supplied to the coil 64.

As shown in FIG. 1, the pulley 17 has an upstream pulley 17A and a downstream pulley 17B.

The upstream pulley 17A includes a first outer cylinder 17D, a first inner cylinder 17E, and a first disk 17F. The first outer cylinder 17D has a power transmission portion 17C about which the belt 18 is wound. The first disk 17F is integrally formed with the first outer cylinder 17D and the first inner cylinder 17E to connect them with each other. The power transmission portion 17C is formed on the outer circumferential portion of the first outer cylinder 17D.

Breakable members, which are substantially columnar power transmission pins 17G (only two are shown) in the first embodiment, are secured to the front surface of the first outer cylinder 17D at equal angular intervals in the circumferential direction of the first outer cylinder 17D. The power transmission pins 17G are fit in holes formed in the front surface of the first outer cylinder 17D. The power transmission pins 17G project forward from the first outer cylinder 17D and are substantially parallel to the axis of the rotary shaft 16. The power transmission pins 17G form shutoff mechanism for shutting-off excessive torque transmission between the engine E and the rotary shaft 16.

The power transmission pins 17G are made of sintered metal. The fatigue ratio σW/σB of the sintered metal is about 0.5. The sign σW represents the fatigue limit and the sign σB represents the tensile strength.

The downstream pulley 17B includes a second inner cylinder 17H, a second disk 17J, and a second outer cylinder 17K. The second disk 17J is formed integrally with the second inner cylinder 17H and extends radially outward from the front end of the second inner cylinder 17H. The second outer cylinder 17K is integrally formed with the second disk 17J and extends rearward from the outer circumferential portion of the second disk 17J.

Shock absorbers, which are rubber dumpers 17L in the first embodiment, are secured to positions corresponding to the power transmission pins 17G at the rear surface of the second outer cylinder 17K of the downstream pulley 17B. Each rubber dumper 17L is accommodated in one of bores formed in the rear surface of the second outer cylinder 17K. Each rubber dumper 17L is cup-shaped and receives the corresponding power transmission pin 17G.

Therefore, in the pulley 17 of the first embodiment, power transmitted from the engine E to the upstream pulley 17A by the belt 18 is transmitted to the downstream pulley 17B by the power transmission pins 17G and the rubber dumpers 17L. That is, the power transmission pins 17G and the rubber dumpers 17L are located in a power transmission path between the upstream pulley 17A and the downstream pulley 17B.

In the first embodiment, the upstream pulley 17A, the downstream pulley 17B, the power transmission pins 17G, and the rubber dumpers 17L constitute the pulley 17. The pulley 17 has an inner space surrounded by the upstream pulley 17A, the downstream pulley 17B, and the like.

A substantially cylindrical hub 65 is fixed to the front end of the rotary shaft 16. A first clutch mechanism, which is a pulley one-way clutch 66 in the first embodiment, is located between the hub 65 and the second inner cylinder 17H of the downstream pulley 17B. The pulley one-way clutch 66 is a first one-way clutch located in a power transmission path between the pulley 17 and the rotary shaft 16.

The pulley one-way clutch 66 is constituted by a clutch portion 67, and a bearing portion 68. The clutch portion 67 and the bearing portion 68 are integrally formed with each other and arranged next to each other in the axial direction of the rotary shaft 16.

The pulley one-way clutch 66 includes an outer ring 69, which is secured to the inner circumferential surface of the second inner cylinder 17H, and an inner ring 70, which is secured to the outer circumferential surface of the hub 65 and surrounded by the outer ring 69. The outer ring 69 and the inner ring 70 rotate relative to each other by rotating bodies, which are balls 71 in the first embodiment. The balls 71 are arranged circumferentially in line between the outer ring 69 and the inner ring 70.

The bearing portion 68 of the pulley one-way clutch 66, which is located between the downstream pulley 17B and the hub 65, is located close to the center of gravity of, or rearward of, the pulley 17.

Figure 3A:
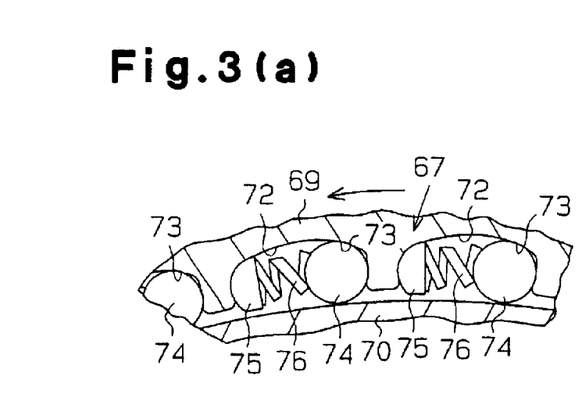
FIGS. 3(a) and 3(b) is an enlarged partial cross-sectional view illustrating a clutch according to the first embodiment.
Figure 3B:
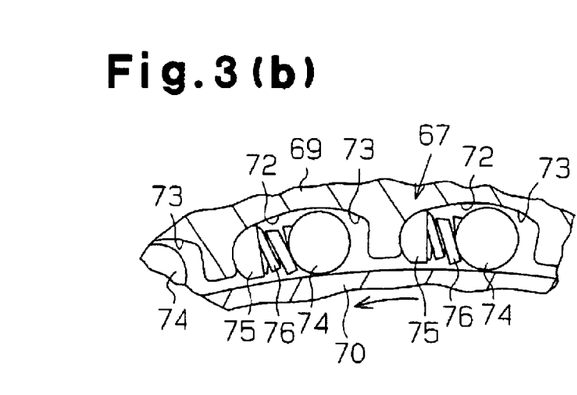

As shown in FIG. 3, recesses 72 are formed at equal angular intervals around the rotary shaft 16 in the inner circumferential portion of the outer ring 69. A power transmission surface 73 is formed at the trailing end of each recess 72. A roller 74 is accommodated in each recess 72 parallel to the rotary shaft 16. Each roller 74 is movable from the position where the roller 74 is engaged with the power transmission surface 73 as shown in FIG. 3(a) to the position where the roller 74 is disengaged from the power transmission surface 73 as shown in FIG. 3(b).

A spring seat 75 is located at the leading end of each recess 72, or the end of each recess 72 that is opposite to the power transmission surface 73. A spring 76 is arranged between each spring seat 75 and the corresponding roller 74 to urge the roller 74 toward the position where the roller 74 is engaged with the power transmission surface 73.

As shown in FIG. 3(a), when the outer ring 69 rotates in the direction indicated by an arrow by power transmitted from the engine E with the pulley 17, each roller 74 moves toward the corresponding power transmission surface 73 by the force of the spring 76. Then, the roller 74 is engaged with the power transmission surface 73. The inner ring 70 is rotated in the same direction as the outer ring 69 by the friction between the roller 74 and the outer circumferential surface of the inner ring 70 and the friction between the roller 74 and the power transmission surface 73.

Therefore, when the vehicle engine E is running, power of the engine E is transmitted to the rotary shaft 16 by the pulley 17, the clutch portion 67, and the hub 65. Thus, the rotary shaft 16 is always driven when the engine E is running.

As shown in FIG. 3(b), if the inner ring 70 is rotated in the direction indicated by an arrow when the engine E (or the pulley 17) is stopped, the roller 74 separates from the power transmission surface 73 against the force of the spring 76. Thus, the inner ring 70 runs idle with respect to the outer ring 69.

As shown in FIG. 1, an electric motor 77 is located in the inner space of the pulley 17. A cylindrical shaft support 12C projects from the front wall of the front housing member 12 and surrounds the front end of the rotary shaft 16. A cylindrical support portion 79A of a stator fixing member 79 is located about the outer circumferential surface of the cylindrical shaft support 12C. The stator fixing member 79 secures a stator 78, which constitutes the electric motor 77 to the housing. A pulley bearing 80 is located between the support portion 79A and the first inner cylinder 17E of the upstream pulley 17A. That is, the pulley 17 is supported by the pulley one-way clutch 66 (the bearing portion 68 of the pulley one-way clutch 66) and the pulley bearing 80, which are located apart from each other.

The stator fixing member 79 includes a cylindrical stator holder 79B, which holds the stator 78, and a connecting portion 79C, which connects the stator holder 79B with the support portion 79A. Part of rear side of the stator holder 79B, the connecting portion 79C, and the support portion 79A are located inward of the power transmission portion 17C. The stator 78 is attached to the inner circumferential surface of the stator holder 79B. The stator 78 is formed of a permanent magnet.

A second rotary body, which is a rotor 81 in the first embodiment, is located inward of the stator holder 79B (more specifically, inward of the stator 78) to face the stator 78. The rotor 81 has a rotor iron core 81A and a coil 81B, which is wound about the rotor iron core 81A. Electric current is supplied to the coil 81B by the brushes 82, which are attached to the connecting portion 79C. The electric motor 77 produce rotational force of the rotor 81 by interaction between the magnetic force of the stator 78 and the magnetic force generated on the rotor 81 in accordance with the current supply.

The brushes 82 are connected to a battery (not shown) via a drive circuit, which is not shown. The drive circuit supplies and stops current to the brushes 82 from the battery based on commands from a controller (not shown).

The stator 78, the stator fixing member 79, the rotor 81, and brushes 82 constitute the electric motor 77. The rear portion of the electric motor 77 overlaps the power transmission portion 17C in the axial direction of the rotary shaft 16. The electric motor 77 is located inward of the power transmission portion 17C in the radial direction of the rotary shaft 16.

A second clutch mechanism, which is a motor one-way clutch 83 in the first embodiment, is located in a power transmission path between the rotor 81 and the rotary shaft 16. The structure of the motor one-way clutch 83 is the same as the pulley one-way clutch 66. Therefore, like or the same reference numerals are given to those components that are like or the same as the corresponding components in the pulley one-way clutch 66 and detailed explanations are omitted. In the motor one-way clutch 83, the outer ring 69 is secured to the inner circumferential surface of the rotor iron core 81A and the inner ring 70 is secured to the outer circumferential surface of the rotary shaft 16. In the motor one-way clutch 83, the bearing portion 68 is located in front of the clutch portion 67.

The pulley one-way clutch 66 is located outward of the motor one-way clutch 83 in the radial direction of the rotary shaft 16.

The pulley 17, the pulley bearing 80, the hub 65, the pulley one-way clutch 66, the motor one-way clutch 83, and the electric motor 77 constitute the power transmission mechanism PT.

In the first embodiment, when the vehicular engine E is running, the power is always transmitted to the rotary shaft 16 by the pulley 17 and the pulley one-way clutch 66. If an air-conditioning is required when the vehicular engine E is stopped (or during an idling-stop mode), the electric motor 77 is actuated and power is transmitted to the rotary shaft 16 by the motor one-way clutch 83.

The vehicle engine E of the first embodiment is temporarily stopped when it is determined that the engine E is idling based on the rotational speed of the engine E, variation of the rotational speed, the vehicle speed, the depressing amount of the acceleration pedal, and the position of the shift lever.

The controller controls the drive circuit such that electric current is not supplied to the brushes 82 when the vehicular engine E is running. When the vehicular engine E is running, power is transmitted from the outer ring 69 of the pulley one-way clutch 66 to the inner ring 70 of the pulley one-way clutch 66. The power of the vehicular engine E is thus transmitted to the rotary shaft 16. At this time, the inner ring 70 of the motor one-way clutch 83 integrally rotates with the rotary shaft 16. However, the inner ring 70 of the motor one-way clutch 83 runs idle with respect to the outer ring 69 of the motor one-way clutch 83. Thus, power of the vehicular engine E is hardly used for rotating the rotor 81.

For example, to rotate the rotor 81 by the rotational force of the rotary shaft 16, an amount of torque that corresponds to the cogging torque caused by magnetic force generated by the stator 78 is required. However, in the first embodiment, when the one-way clutch 83 runs idle, the torque transmitted from the inner ring 70 to the outer ring 69 is smaller than the cogging torque. Therefore, when current is not supplied to the brushes 82, the rotor 81 is hardly rotated although the rotary shaft 16 is rotated.

The drive circuit supplies current to the brushes 82 to drive the electric motor 77 based on commands from the controller only when the engine E is in the idling-stop mode when air-conditioning is required. The rotational force of the rotor 81 generated by current supply is transmitted from the outer ring 69 of the motor one-way clutch to the inner ring 70 of the motor one-way clutch 83. Therefore, power of the electric motor 77 is transmitted to the rotary shaft 16. This enables air-conditioning of a passenger compartment while the vehicular engine E is in the idling stop mode.

At this time, the inner ring 70 of the pulley one-way clutch 66 integrally rotates with the hub 65 and the rotary shaft 16. However, the inner ring 70 runs idle with respect to the outer ring 69 of the pulley one-way clutch 66. Thus, power of the electric motor 77 is hardly transmitted to the pulley 17.

In the first embodiment, the electric motor 77 is weaker than the engine E with regard to the ability to drive the compression mechanism. That is, the maximum performance obtained when the compression mechanism is driven by the electric motor 77 is less than the maximum performance that the compression mechanism is required.

Power transmitted from the engine E to the upstream pulley 17A is transmitted to the downstream pulley 17B through the rubber dampers 17L and the power transmission pins 17G.

The rubber dumpers 17L located in the power transmission path between the upstream pulley 17A and the downstream pulley 17B absorb the misalignment between the rotation axes of the upstream pulley 17A and the downstream pulley 17B. That is, the deformation of the rubber dumpers 17L reduces stress applied to the bearings, such as the radial bearing 12A, the bearing portion 68 of the pulley one-way clutch 66, and the pulley bearing 80, due to the misalignment of the rotation axes. The rubber dumpers 17L dampen the rotation-vibration (torque fluctuation) of the rotary shaft 16 caused by the compression reaction force at the compression mechanism and prevent the rotation-vibration from being transmitted from the downstream pulley 17B to the upstream pulley 17A.

The pulley one-way clutch 66 transmits power from the pulley 17 to the hub 65 but hardly transmits power from the hub 65 to the pulley 17. Therefore, the rotation-vibration is not transmitted from the hub 65 to the pulley 17.

As long as the magnitude of the transmission torque between the upstream pulley 17A and the downstream pulley 17B does not adversely affect the engine E (within the transmission torque in a normal power transmission state), power is transmitted from the engine E to the rotary shaft 16.

However, if there is an abnormality in the compressor C, for example, if the compressor C is locked, and the transmission torque is excessive, the power transmission pins 17G are broken by excessive load. That is, power is prevented from being transmitted from the upstream pulley 17A to the downstream pulley 17B. This prevents the engine E from being adversely affected by the excessive torque.

The first embodiment has the following advantages.

(1) The electric motor 77 is located inside the pulley 17 surrounded by, for example, the upstream pulley 17A and the downstream pulley 17B. In this case, the size of the power transmission mechanism PT is reduced by efficiently using the internal space.

(2) The rear portion of the electric motor 77 overlaps the power transmission portion 17C in the axial direction of the rotary shaft 16. Therefore, as compared to a case in which the electric motor 77 does not overlap the power transmission portion 17C in the axial direction of the rotary shaft 16, the compressor is minimized in the axial direction of the rotary shaft.

(3) The electric motor 77 drives the rotary shaft 16 only when the engine E is in the idling stop mode. Generally, the time length the engine E is in the idling-stop mode is significantly less than the time length the engine E is running. Thus, the electric motor 77, which is rather weak, sufficiently drives the compressor. The size reduction of the electric motor 77 reduces the size of the compressor.

(4) The pulley one-way clutch 66 is located in the power transmission path between the pulley 17 and the rotary shaft 16, and the motor one-way clutch 83 is located in the power transmission path between the electric motor 77 and the rotary shaft 16. Therefore, one of the power transmission paths is connected while the other is disconnected. In this case, the rotary shaft 16 is rotated by power of the vehicular engine E without rotating the rotor 81 of the electric motor 77. To rotate the rotor 81 by the rotation of the rotary shaft 16, the rotary shaft 16 needs to be rotated by a torque that corresponds to the cogging torque caused by the stator 78. This applies additional rotary load to the rotary shaft 16. With the structure of the first embodiment, the rotary load is decreased by connecting the pulley one-way clutch 66 and disconnecting the motor one-way clutch 83.

When the motor one-way clutch 83 is disengaged, the rotor 81 is prevented from being rotated even when the rotary shaft 16 is rotated by the pulley 17 at high speed although the electric motor 77 is weak.

That is, electromotive force is prevented from being induced excessively at the coil 81B due to the rotation of the rotor 81. This prevents the electric motor 77 from causing problems such as overheating due to excessive electromotive force. In the first embodiment, the pulley one-way clutch 66 is located in the power transmission paths between the pulley 17 and the rotary shaft 16, and the motor one-way clutch is located between the electric motor 77 and the rotary shaft 16. Thus, the first embodiment is very effective for the electric motor 77, which is weak, used in a relatively low rotational speed range.

(5) As compared to a case in which at least one of the pulley one-way clutch 66 and the motor one-way clutch 83 is an electromagnetic clutch, devices for controlling the electromagnetic clutch is unnecessary. This simplifies the structure of the vehicular rotational apparatus.

(6) The pulley one-way clutch 66 and the motor one-way clutch 83 each includes the bearing portion 68 and the clutch portion 67, which are integrally formed. Therefore, as compared to a structure in which each one-way clutch 66, 83 is formed of a separate bearing portion 68 and a clutch portion 67, the number of components of the one-way clutch 66, 83 is reduced.

(7) The bearing portion 68 of the pulley one-way clutch 66 is located close to the center of gravity of the pulley 17. Therefore, as compared to a case in which the clutch portion 67 is located close to the center of gravity of the pulley 17, the distance between the bearing portion 68 and the center of gravity is shorter. Thus, the rotation of the pulley 17 is stabilized. In this case, backlash of the clutch portion 67 of the pulley one-way clutch 66 is prevented.

(8) The pulley one-way clutch 66 is located outward of the motor one-way clutch 83 in the radial direction of the rotary shaft 16. In this case, the pulley one-way clutch 66 is larger than the motor one-way clutch 83 in the radial direction. As a result, the pulley one-way clutch 66 is capable of receiving a greater transmission torque than the motor one-way clutch 83, and the durability of the pulley one-way clutch 66 when the clutch portion 67 is in a connected state is easily improved. It is very effective since the pulley one-way clutch 66, which transmits power from the engine E to the rotary shaft 16, is in the connected state longer than the motor one-way clutch 83.

The inner ring 70 of the motor one-way clutch 83 runs idle with the outer ring 69 when the engine E is running and rotates integrally with the outer ring 69 only when air-conditioning is required while the engine E is stopped. Therefore, the time length during which the inner ring 70 of the motor one-way clutch 83 runs idle with the outer ring 69 is generally longer than the time length during which the inner ring 70 rotates integrally with the outer ring 69. The friction generated when the inner ring 70 runs idle with the outer ring 69 is reduced as the outer diameter of the inner ring 70 is reduced. Therefore, reducing the outer diameter of the inner ring 70 improves the durability of the bearing portion 68 of the motor one-way clutch 83, or the durability of the motor one-way clutch 83.

(9) The pulley 17 is supported by the pulley one-way clutch 66 (the bearing portion 68 of the pulley one-way clutch 66) and the pulley bearing 80, which are located apart from each other. Therefore, when an external force is applied to the pulley 17, the pulley 17 is prevented from being inclined with respect to the rotation axis of the rotary shaft 16. In this case, the pulley 17 is prevented from being unevenly worn due to inclination of the pulley 17, and backlash of the clutch portion 67 of the pulley one-way clutch 66 is suppressed.

(10) The power transmission pins 17G prevent excessive load from being applied to the vehicular engine E, even when the compressor C causes an abnormality, or the compressor C is locked.

(11) The power transmission pins 17G are made of sintered metal. Since the ductility of the sintered metal is relatively low, the threshold level of the transmission torque at which the power transmission pins 17G are broken is easily determined. Also, the fatigue ratio σW/σB of the sintered metal is easily set high. Therefore, the durability of the power transmission pins 17G to withstand repetitive stress in the normal power transmission state is set relatively high. Also, the balance between the durability of the power transmission pins 17G and the level of the transmission torque at which the power transmission pins 17G are broken is easily optimized. Accordingly, it is easy to design the mechanism such that the power transmission pins 17G have a satisfactory durability and do not break for the transmission torque in the normal transmission state, and break when the transmission torque is excessive.

(12) The rubber dampers 17L are located in the power transmission path between the upstream pulley 17A and the downstream pulley 17B. In this case, the misalignment of the rotation axes between the upstream pulley 17A and the downstream pulley 17B caused by, for example, a manufacturing tolerance is absorbed by the rubber dampers 17L. Therefore, the deformation of the rubber dumpers 17L reduces stress applied to the bearings, such as the radial bearing 12A, the bearing portion 68 of the pulley one-way clutch 66, and the pulley bearing 80, due to the misalignment of the rotation axes. As a result, the durability of the vehicular rotational apparatus is improved.

(13) The rubber dampers 17L reduce the rotation vibration (torque fluctuation) transmitted from the downstream pulley 17B to the upstream pulley 17A. As a result, vibration between the vehicular engine E and the rotary shaft 16 caused by fluctuation of the transmission torque is suppressed (14) The amount of refrigerant discharged from the compression mechanism during one rotation of the rotary shaft 16 can be substantially zero. In this case, the amount of refrigerant discharged from the compression mechanism can be substantially zero even when the rotary shaft 16 is being rotated. As a result, when air-conditioning is unnecessary, the load required to drive the rotary shaft 16 is minimized (to zero if possible).

(15) The displacement (flow rate of refrigerant) of the compressor C, which greatly affects the load torque of the compressor C, is directly and externally controlled. Also, for example, the flow rate of refrigerant is controlled to be less than or equal to a predetermined amount with high accuracy and quick response without using, for example, a flow rate sensor.

A second embodiment of the present invention will now be described. The second embodiment is the same as the first embodiment except for the structure of the power transmission mechanism PT. Mainly, the differences from the first embodiment will be discussed below, and same or like reference numerals are given to parts that are the same as or like corresponding parts of the first embodiment.

Figure 4A:
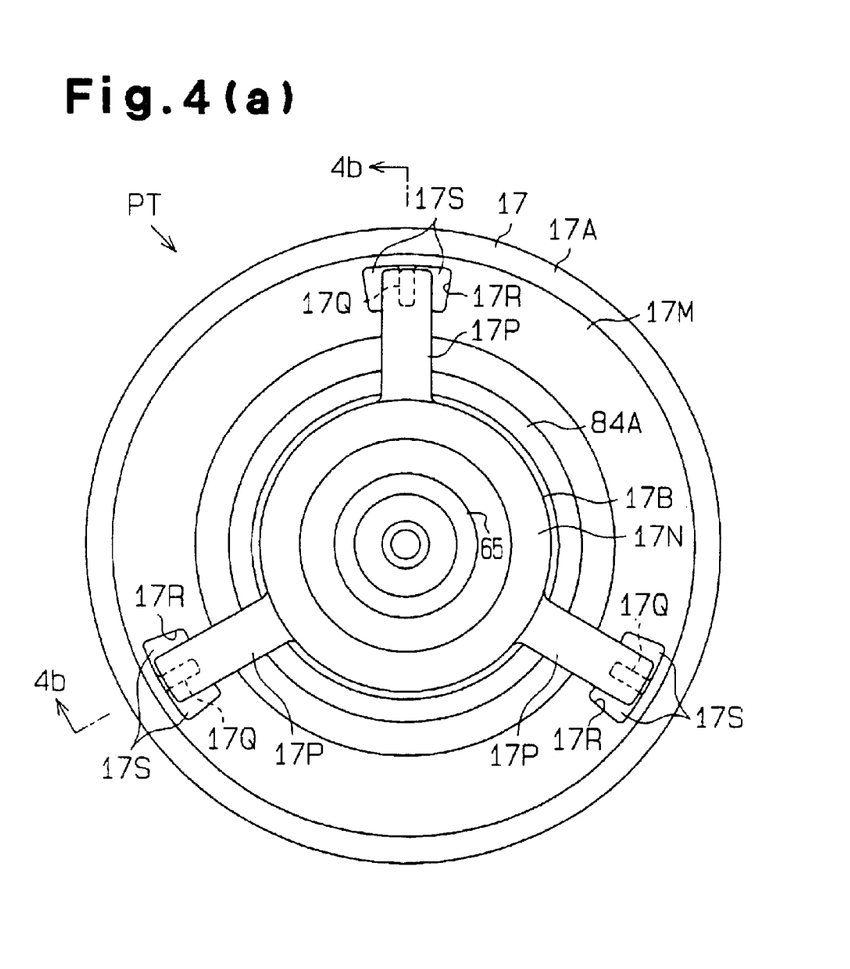
FIG. 4(a) is a front view illustrating a power transmission mechanism according to a second embodiment.
Figure 4B:
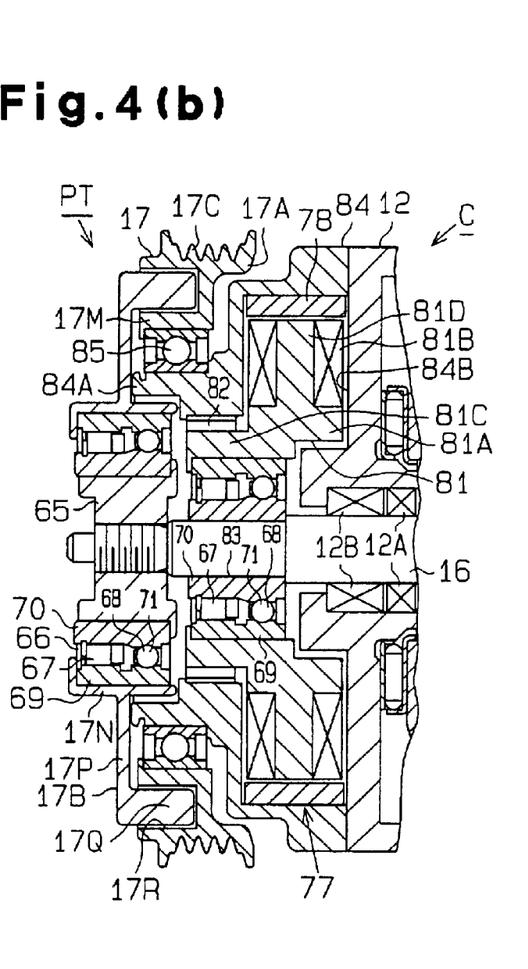
FIG. 4(b) is a cross-sectional view taken along line 4b—4b in FIG. 4(a)

FIG. 4(a) is a front view illustrating the power transmission mechanism PT. FIG. 4(b) is a cross-sectional view taken along line 4b—4b in FIG. 4(a). Part of the compressor C is also shown in FIG. 4(b).

In the second embodiment, a motor housing 84 is secured to the front end of the front housing member 12. The motor housing 84, the cylinder block 11, the front housing member 12, the valve plate assembly 13, and the rear housing member 14 form the housing of the compressor C.

A shaft support 84A projects from the front wall of the motor housing 84 to surround the front end of the rotary shaft 16. The upstream pulley 17A of the pulley 17 according to the second embodiment is rotatably supported by the outer circumferential surface of the shaft support 84A with a pulley bearing 85. In FIG. 4(a), the pulley bearing 85 is not shown.

The upstream pulley 17A of the second embodiment includes an annular main body 17M, which is fitted about the outer ring of the pulley bearing 85, and the power transmission portion 17C, which is located at the outer circumference of the main body 17M.

The downstream pulley 17B, which forms a part of the pulley 17 of the second embodiment, is secured to the outer ring 69 of the pulley one-way clutch 66. The downstream pulley 17B includes a cylindrical portion 17N, which is fitted about the outer ring 69, arms 17P (three in the second embodiment)(shutoff mechanism), which radially project outward from the outer circumferential surface of the cylindrical portion 17N, and power transmission pieces 17Q, which project rearward from the distal end of the arms 17P. The downstream pulley 17B according to the second embodiment is integrally made of sintered metal that is the same as that used for the power transmission pins 17G of the first embodiment. In the second embodiment, the arms 17P form a shutoff mechanism.

Each arm 17P of the downstream pulley 17B is located at equal angular intervals in the circumferential direction of the pulley 17. Accommodating bores 17R are formed in the main body 17M at positions facing the power transmission pieces 17Q. A rear portion of each power transmission piece 17Q is inserted into one of the accommodating bores 17R.

Figure 5:
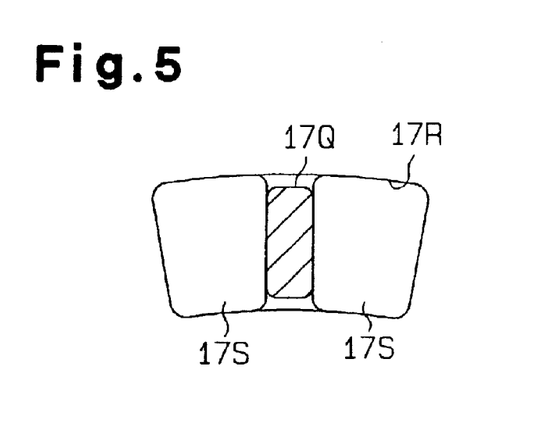
FIG. 5 is an enlarged partial cross-sectional view illustrating rubber dumpers and a power transmission piece according to the second embodiment.

As shown in FIGS. 4(a) and 5, shock absorbers, which are rubber dumpers 17S in the second embodiment, are press fitted in both sides (in the circumferential direction of the pulley 17) of each power transmission piece 17Q in the corresponding accommodating bore 17R. With this structure, power transmitted from the engine E to the upstream pulley 17A is transmitted to the downstream pulley 17B via the rubber dumpers 17S. The rubber dumpers 17S dampen torque fluctuation transmitted from the downstream pulley 17B to the upstream pulley 17A. Further, the deformation of the rubber dumpers 17S reduces stress applied to the bearings, such as the radial bearing 12A, the bearing portion 68 of the pulley one-way clutch 66, and the pulley bearing 85, due to the misalignment of the rotary axes of the upstream pulley 17A and the downstream pulley 17B.

In the second embodiment, if there is an abnormality in the compressor C, and the transmission torque between the upstream pulley 17A and the downstream pulley 17B is excessive, the arms 17P are broken by excessive load. That is, the power is prevented from being transmitted from the upstream pulley 17A to the downstream pulley 17B, which prevents the engine E from being adversely affected by excessive torque transmission.

As shown in FIG. 4(b), a motor chamber 84B is defined by the front wall of the front housing member 12 and the motor housing 84. In the second embodiment, the electric motor 77 is located in the motor chamber 84B.

The rotor iron core 81A of the electric motor 77 includes a cylindrical portion 81C, which is fitted about the outer ring 69 of the motor one-way clutch 83, and a coil holder 81D, which extends radially outward from the rear portion of the cylindrical portion 81C. The coil 81B is wound about the coil holder 81D The center of gravity of the rotor 81, which is formed by the rotor iron core 81A and the coil 81B, is located rearward of the cylindrical portion 81C. In the motor one-way clutch 83 according to the second embodiment, the bearing portion 68 is located rearward of the rotor 81 with respect to the clutch portion 67.

In the second embodiment, the stator 78 is secured to the inner circumferential surface of the motor housing 84 at a position opposite to and radially outward of the coil 81B and the coil holder 81D. The brushes 82 are attached to the inner circumferential surface of the shaft support 84A at a position opposite to and radially outward of the front portion of the cylindrical portion 81C.

Part of the front side of the rotor 81 and the stator 78, and the brushes 82 overlap the power transmission portion 17C in the axial direction of the rotary shaft 16.

In addition to the advantages (2) to (8) and (10) to (15), the second embodiment has the following advantage.

(16) The electric motor 77 is accommodated close to the housing of the compressor C. In this case, the size of the pulley is reduced and the moment of inertia is easily reduced as compared to the structure of the first embodiment, in which the electric motor is located inside the pulley. As a result, the rotational response of the pulley 17 is easily improved.

A third embodiment of the present invention will now be described. The third embodiment is the same as the second embodiment except for the structure of the electric motor 77. Mainly, the differences from the second embodiment will be discussed below, and same or like reference numerals are given to parts that are the same as or like corresponding parts of the second embodiment.

Figure 6:
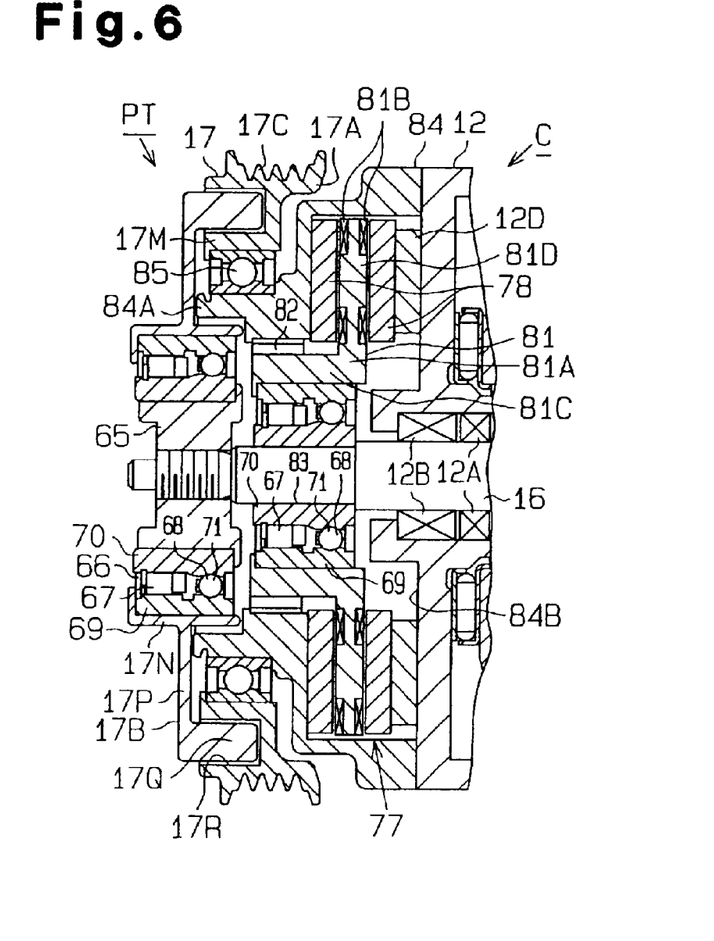
FIG. 6 is an enlarged cross-sectional view illustrating a power transmission mechanism according to a third embodiment of the present invention.

As shown in FIG. 6, in the electric motor 77 of the third embodiment, the stator 78 is formed by permanent magnets located on the front and rear sides of the coil holder 81D of the rotor 81. That is, the front and rear sides of the coil 81B and the coil holder 81D each face the stator 78, or one of the permanent magnets. The permanent magnet located at the front side is secured to the inner surface of the motor housing 84, and the permanent magnet located at the rear side is secured to the front surface of the front wall of the front housing member 12 with a support member 12D.

In addition to the advantages (2) to (8) and (10) to (16), the third embodiment has the following advantage.

(17) The front and rear sides of the coil 81B and the coil holder 81D each face the stator 78, or one of the permanent magnets. In this case, the magnetic field around the coil 81B and the coil holder 81D generated by the magnetic force of the stator 78 is easily increased. Therefore, the output of the electric motor 77 is easily increased.

It should be apparent to those skilled in the art that the present invention may be embodied in many other specific forms without departing from the spirit or scope of the invention. Particularly, it should be understood that the invention may be embodied in the following forms.

The pulley one-way clutch 66 may be located inward of the motor one-way clutch 83 in the radial direction of the rotary shaft 16, or the pulley one-way clutch 66 and the motor one-way clutch 83 may be located at the same position in the radial direction of the rotary shaft 16.

The bearing portion 68 of the pulley one-way clutch 66 according to the first embodiment may be located forward of the pulley 17. The bearing portion 68 of the motor one-way clutch 83 according to the second embodiment may be located forward of the rotor 81.

The one-way clutch 66, 83 is formed by the clutch portion 67 and the bearing portion 68, which are integrally formed. However, the one-way clutch 66, 83 may be formed by the clutch portion 67 and the bearing portion 68 that are separately formed.

One of the one-way clutches 66, 83 may be a one-way clutch and the other may be an electromagnetic clutch, or both one-way clutches 66, 83 may be electromagnetic clutches.

The compression performance obtained when the electric motor 77 drives the compression mechanism at the maximum may be equal to or greater than the compression performance obtained when the engine E drives the compression mechanism at the maximum.

The electric motor 77 drives the rotary shaft 16 only when the engine E is in the idling-stop mode. However, the electric motor 77 may be formed to drive the rotary shaft 16 at times other than when the engine E is in the idling-stop mode.

In the illustrated embodiments, the electric motor 77 that supplies current to the rotor 81 using brushes 82 is used. However, a brushless type electric motor that supplies current to the stator 78 without using brushes may be used. In this case also, the electric motor 77 efficiently obtains rotational force and the size of the electric motor 77 is minimized as compared to an electric motor that obtains rotational force without using magnetic force of a permanent magnet. For example, a reluctance motor or a stepping motor may be used as the brushless type electric motor.

In the illustrated embodiments, the fatigue ratio σW/σB of the sintered metal that forms the breakable member need not be about 0.5. In this case, the fatigue ratio σW/σB may be any value as long as the breakable members are broken when receiving excessive torque.

In the illustrated embodiments, the breakable member need not be formed of the sintered metal. For example, the breakable members may be made of low-carbon steel. The fatigue ratio σW/σB of low-carbon steel is easily set high (approximately 0.5). Therefore, the durability of the breakable members to withstand repetitive stress in the normal power transmission state is set relatively high. Also, the balance between the durability of the breakable members and the level of the transmission torque at which the breakable members are broken is easily optimized. Accordingly, it is easy to design the apparatus such that the breakable members have a satisfactory durability and do not break for the transmission torque in the normal transmission state, and break when the transmission torque is excessive.

In the illustrated embodiments, the breakable member need not be formed of the metal. Specifically, as long as the breakable members are broken when receiving a torque that exceeds a predetermined amount, any material such as resin or ceramic may be used for the breakable members.

In the illustrated embodiments, breakable power transmission pins 17G or the arms 17P form shutoff mechanism for shutting-off excessive torque transmission between the engine E and the rotary shaft 16. However, the shutoff mechanism need not be formed as the illustrated embodiments. For example, a coupling member may be located in the transmission path between the upstream rotor and the downstream rotor. The coupling member connects the rotors and can disengage from at least one of the rotors.

The shutoff mechanism, such as the power transmission pins 17G and the arms 17P, may be omitted.

In the illustrated embodiments, the shock absorbers made of rubber (rubber dampers 17L) are used. However, the shock absorbers made of elastomer may be used.

In the above embodiments, the shock absorbers need not be located in the power transmission path between the power transmission portion 17C and the rotary shaft 16.

In the illustrated embodiments, the one-way clutch 66, 83 selectively permits and prevents power transmission between the outer ring 69 and the inner ring 70 by the friction caused by the rollers 74. However, the one-way clutch need not have this structure. For example, the one-way clutch may have any structure as long as the one-way clutch permits power transmission from the pulley 17 and the electric motor 77 to the rotary shaft 16 and prevents power transmission from the rotary shaft 16 to the pulley 17 and the electric motor 77.

In the illustrated embodiments, the bearing portion 68 may have multiple rows of balls 71 arranged in the axial direction of the rotary shaft 16.

In the illustrated embodiments, the control valve 43 detects the pressure difference between two pressure monitoring points located in the refrigerant circuit and automatically determines the position of the valve body 52 to change the displacement to balance the fluctuation of the pressure difference. However, the control valve need not have this structure. For example, the control valve 43 may be formed to change the position of the valve body 52 in accordance with the pressure at one pressure monitoring point located in the refrigerant circuit. Alternatively, the control valve 43 may be formed to change the position of the control valve 43 by only the external commands.

In the illustrated embodiments, the criterion used for positioning the valve body 52 need not be changed by the external control. For example, the control valve 43 need not be externally controlled and the position of the valve body 52 may be determined automatically.

In the illustrated embodiments, the power transmission mechanism PT is used for the compressor C, which has the single headed pistons 25. However, the mechanism PT may be used for a compressor that has double-headed pistons. In this type of compressor, cylinder bores are formed on either side of a crank chamber and each piston compresses gas in one of the pairs of the cylinder bores.

In the illustrated embodiments, drive plate (swash plate 20) rotates integrally with the rotary shaft 16. However, the present invention may be applied to a compressor in which relative rotation between the drive plate and the rotary shaft is permitted. For example, the present invention may be applied to a wobble type compressor.

In the compressor C, the amount of refrigerant discharged during one rotation of the rotary shaft 16 can be changed to substantially zero. However, the displacement need not be able to be changed to substantially zero.

The pulley 17 may be used in a fixed displacement type compressor, in which the stroke of the pistons 25 is constant.

In the illustrated embodiments, the present invention is applied to a reciprocal piston type compressor However, the present invention may be applied to rotary compressors such as a scroll type compressor.

The present invention may be applied to any type of rotor other than pulley. For example, the present invention may be applied to a sprocket or a gear.

In the illustrated embodiments, the present invention is applied to a compressor. However, the present invention may be applied to any rotational apparatus, which drives a rotary shaft by power from an external drive source and power from an electric motor. For example, the present invention may be applied to a hydraulic pump for a power steering pump.

Therefore, the present examples and embodiments are to be considered as illustrative and not restrictive and the invention is not to be limited to the details given herein, but may be modified within the scope and equivalence of the appended claims.

What is claimed is:

1. A vehicular rotational apparatus that is driven by an external drive source, the rotational apparatus comprising:
   a housing;
   a rotary shaft rotatably supported by the housing;
   a first rotary body operably connected to the rotary shaft, wherein the first rotary body includes a power transmission portion, and wherein, when power is transmitted from the external drive source to the power transmission portion, the first rotary body is rotated;

an electric motor for rotating the rotary shaft, wherein the electric motor includes a second rotary body, which is operably connected to the rotary shaft, and wherein at least part of the electric motor overlaps the power transmission portion in the axial direction of the rotary shaft;

a first clutch mechanism located between the first rotary body and the rotary shaft, wherein the first clutch mechanism selectively permits and prevents power transmission between the first rotary body and the rotary shaft; and a second clutch mechanism located between the second rotary body and the rotary shaft, wherein the second clutch mechanism selectively permits and prevents power transmission between the second rotary body and the rotary shaft.

2. The rotational apparatus according to claim 1, wherein the electric motor is located inward of the power transmission portion in the radial direction of the rotary shaft.

3. The rotational apparatus according to claim 1, wherein the electric motor has a permanent magnet, and wherein the second rotary body is rotated by the magnetic force of the permanent magnet.

4. The rotational apparatus according to claim 1, wherein the electric motor rotates the rotary shaft when the external drive source is stopped.

5. The rotational apparatus according to claim 1, wherein the external drive source is a vehicular engine, wherein, when the engine is determined to be in an idling mode, the engine is stopped and the electric motor rotates the rotary shaft.

6. The rotational apparatus according to claim 1, wherein the first clutch mechanism is a one-way clutch, and the one-way clutch permits power transmission from the first rotary body to the rotary shaft and prevents power transmission from the rotary shaft to the first rotary body.

7. The rotational apparatus according to claim 6, wherein the one-way clutch is a unit integrally formed by a clutch portion and a bearing portion, which are arranged along the axial direction of the rotary shaft, and wherein the first rotary body is supported by the rotary shaft with the bearing portion.

8. The rotational apparatus according to claim 7, wherein the bearing portion is closer to the center of gravity of the first rotary body compared to the clutch portion in the axial direction of the rotary shaft.

9. The rotational apparatus according to claim 1, wherein the second clutch mechanism is a one-way clutch, and the one-way clutch permits power transmission from the second rotary body to the rotary shaft and prevents power transmission from the rotary shaft to the second rotary body.

10. The rotational apparatus according to claim 9, wherein the one-way clutch is a unit integrally formed by a clutch portion and a bearing portion, which are arranged along the axial direction of the rotary shaft, and wherein the second rotary body is supported by the rotary shaft with the bearing portion.

11. The rotational apparatus according to claim 10, wherein the bearing portion is closer to the center of gravity of the second rotary body compared to the clutch portion in the axial direction of the rotary shaft.

12. The rotational apparatus according to claim 1, wherein the first clutch mechanism is a first one-way clutch, and the first one-way clutch permits power transmission from the first rotary body to the rotary shaft and prevents power transmission from the rotary shaft to the first rotary body, and wherein the second clutch mechanism is a second one-way clutch, and the second one-way clutch permits power transmission from the second rotary body to the rotary shaft and prevents power transmission from the rotary shaft to the second rotary body, and wherein the second one-way clutch is located inward of the first one-way clutch in the radial direction of the rotary shaft.

13. The rotational apparatus according to claim 1, further comprising a shutoff mechanism, which is located in a part of a power transmission path extending from the first rotary body to the rotary shaft, wherein the shutoff mechanism shuts-off excessive torque transmission between the external drive source and the rotary shaft.

14. The rotational apparatus according to claim 1, further comprising a shock absorber located in a part of a power transmission path extending from the first rotary body to the rotary shaft.

15. The rotational apparatus according to claim 1, further comprising a compression mechanism accommodated in the housing, wherein the compression mechanism is driven by the rotary shaft to compress and discharge refrigerant.

16. The rotational apparatus according to claim 15, wherein the maximum performance obtained when the compression mechanism is driven by the electric motor is less than the maximum performance that the compression mechanism is required.

17. The rotational apparatus according to claim 15, wherein the compression mechanism is configured such that the amount of refrigerant discharged from the compression mechanism during one rotation of the rotary shaft is variable in a range from substantially zero to a predetermined amount.

18. A vehicular rotational apparatus that is driven by an external drive source, the rotational apparatus comprising:

a housing;

a rotary shaft rotatably supported by the housing;

a first rotary body operably connected to the rotary shaft, wherein the first rotary body includes a power transmission portion, and wherein, when power is transmitted from the external drive source to the power transmission portion, the first rotary body is rotated;

an electric motor for rotating the rotary shaft, wherein the electric motor includes a second rotary body, which is operably connected to the rotary shaft, and a permanent magnet, which is supported by the housing, and wherein at least part of the electric motor overlaps the power transmission portion in the axial direction of the rotary shaft, and the electric motor is located inward of the power transmission portion in the radial direction of the rotary shaft;

a first one-way clutch located between the first rotary body and the rotary shaft, wherein the first one-way clutch permits power transmission from the first rotary body to the rotary shaft and prevents power transmission from the rotary shaft to the first rotary body; and a second one-way clutch located between the second rotary body and the rotary shaft, wherein the second one-way clutch permits power transmission from the second rotary body to the rotary shaft and prevents power transmission from the rotary shaft to the second rotary body.

* * * * *